UNITED STATES PATENT OFFICE.

JÜRGEN CALLSEN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

BROMODIETHYLACETYLUREA.

983,425.  Specification of Letters Patent.  Patented Feb. 7, 1911.

No Drawing.  Application filed May 6, 1910. Serial No. 559,732. (Specimens.)

*To all whom it may concern:*

Be it known that I, JÜRGEN CALLSEN, doctor of philosophy, chemist, a citizen of the German Empire, residing at Elberfeld, Germany, have invented new and useful Improvements in Bromodiethylacetylurea, of which the following is a specification.

My invention concerns the production of the hitherto unknown bromodiethylacetylurea of the formula:

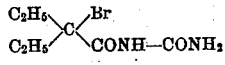

which has proved to be a valuable sedative, an average dose being from ¼ to ½ gram. The process for its production consists in treating urea with bromodiethylacetylbromid.

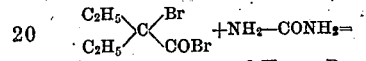

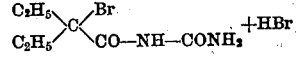

In order to illustrate my process more fully the following example is given, the parts being by weight: 120 parts of urea are mixed together with 258 parts of bromodiethylacetylbromid (obtainable by the action of bromin upon diethylacetic acid anhydrid.) The mixture is allowed to stand for 12 hours and is then heated for 3 hours on the water bath. After cooling the mass of the reaction is pulverized and stirred with water and such a quantity of sodium carbonate that the mixture just shows an alkaline reaction.

The new product is filtered off and recrystallized from alcohol. It forms a colorless, tasteless and odorless white crystalline powder melting at from 114–118° C. It is difficultly soluble in cold water, petrolic ether and ligroin, easily soluble in alcohol and acetone. It is split up by treatment with caustic soda lye, the reaction probably being a very complicated one, owing to the fact that caustic soda acts in various manners on the molecule. It may substitute the hydroxyl group for bromin, it may also split off hydrobromic acid and form a double link. It may also split off urea which might further be decomposed in carbonic acid and ammonia. The following formulæ will illustrate these reactions:

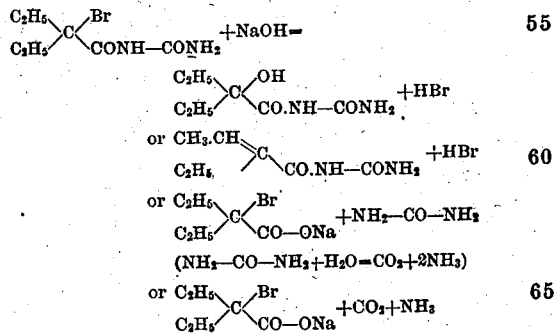

I claim:—

The herein described bromodiethylacetylurea, being a white crystalline powder melting at 114–118° C. difficultly soluble in cold water, petrolic ether and ligroin, easily soluble in alcohol and ether, being a valuable sedative, substantially as described.

In testimony whereof I have hereunto set my hand in the presence of two subscribing witnesses.

JÜRGEN CALLSEN. [L. S.]

Witnesses:
 OTTO KÖNIG,
 CHAS. J. WRIGHT.